(No Model.)

A. CALHOUN.
GRAIN HARVESTER.

No. 543,466. Patented July 30, 1895.

Witnesses.
John C. Duncan
George Adams

Inventor:
Alfred Calhoun

United States Patent Office.

ALFRED CALHOUN, OF HARDY, OHIO.

GRAIN-HARVESTER.

SPECIFICATION forming part of Letters Patent No. 543,466, dated July 30, 1895.

Application filed December 17, 1894. Serial No. 532,125. (No model.)

*To all whom it may concern:*

Be it known that I, ALFRED CALHOUN, a citizen of the United States, residing in Hardy township, (post-office, Millersburg,) in the county of Holmes and State of Ohio, have invented a new and useful Improvement in Grain-Harvesters, of which the following is a specification.

My invention relates to an improvement in grain-harvesters whereby the operator assists the horses hauling said harvesters to turn corners with ease.

The object of my improvement is to enable the operator by a special device to assist the team in turning said grain-harvester at corners, and is constructed by a ratchet-wheel being attached to the grain-wheel of any grain-harvester, said ratchet-wheel to be operated by a pawl attached to an upright on a shaft which has an adjustable relief-fork attached to the same to throw the pawl out when the hand-lever stands at or near a perpendicular position and to be held in said position securely by a spring-latch or otherwise when not in use; the entire mechanism to be operated by a hand-lever attached to a shaft extending to or near the driver's seat, said shaft to be secured to the platform by suitable bearings or otherwise at or near each end of said shaft. I attain these objects by the mechanism illustrated in the accompanying drawings, in which—

Figure 1:
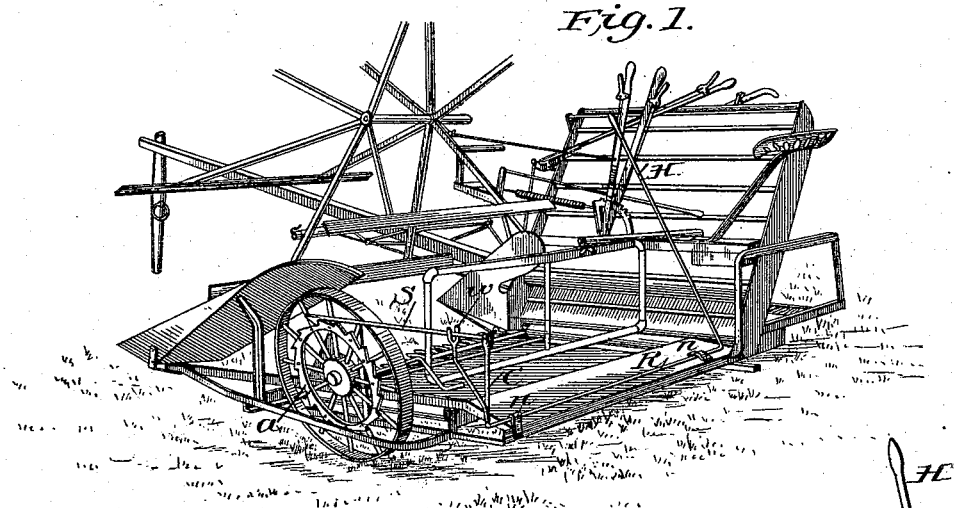
Figure 2:
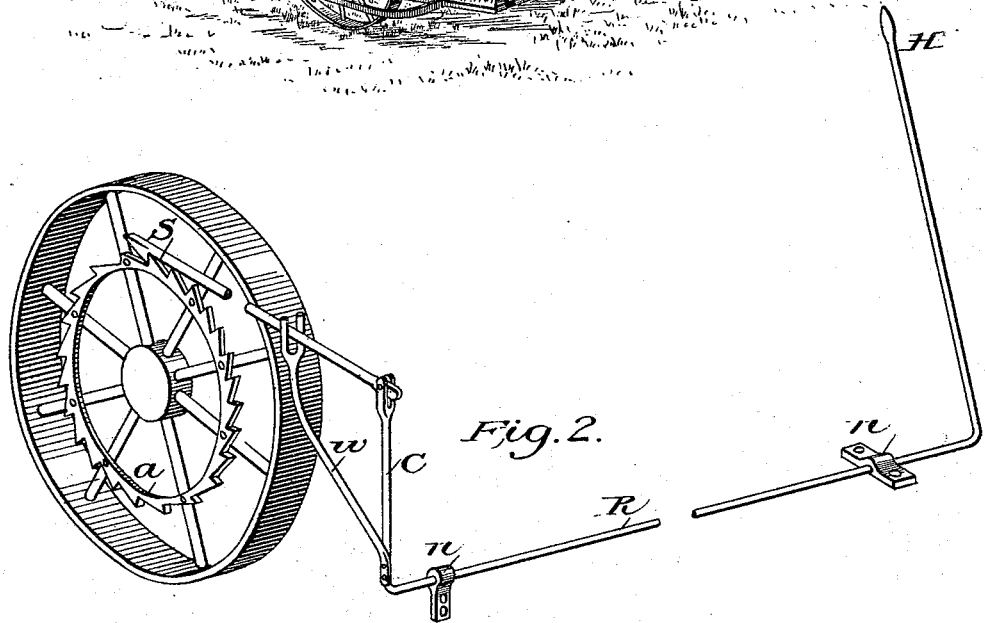

Figure 1 represents a grain-harvester with my improvement attached. Fig. 2 shows my improvement detached.

Similar letters refer to similar parts throughout both views.

A is a ratchet-wheel attached to the grain-wheel of any grain-harvester.

S is a pawl reaching from the ratchet-wheel to an upright shaft C, and is connected therewith by break-pin or otherwise.

W is an adjustable relief fork and guide.

C is an upright shaft to which the pawl is attached.

R is a rock-shaft.

N represents bearings for the rock-shaft, and H the hand-lever secured thereto.

My improvement is operated by the operator of the grain-harvester clasping the lever H and pushing it forward until the pawl S catches the ratchet-wheel A, then pulling the lever H backward, revolving the ratchet-wheel A and grain-wheel backward, and repeating this operation until the machine is in the desired position, the operator thus assisting the team to turn corners.

What I claim as my invention, and desire to secure by Letters Patent, is—

The combination in a harvester of a grain wheel having a ratchet rim secured thereto, an arm pivoted to the harvester frame and carrying a pawl adapted to engage with said ratchet rim, and means within reach from the driver's seat having connections with said pivoted arm whereby the arm may be rocked and the grain wheel revolved backwardly.

ALFRED CALHOUN.

Witnesses:
JAMES C. CALHOUN,
GEORGE HITES.